United States Patent [19]

Forti

[11] Patent Number: 5,307,674

[45] Date of Patent: May 3, 1994

[54] AUTOMATIC EQUIPMENT FOR PNEUMATIC CALIBRATION

[76] Inventor: José E. Forti, 01215 - Al. Glete, 485 - Sao Paulo, Brazil

[21] Appl. No.: 765,055

[22] Filed: Sep. 24, 1991

[30] Foreign Application Priority Data

Nov. 13, 1990 [BR] Brazil .................. 90 07052

[51] Int. Cl.$^5$ .................. G01F 25/00; G01L 17/00
[52] U.S. Cl. .................. 73/146.3; 137/229; 141/38; 141/39
[58] Field of Search .................. 73/3, 1 R, 4 R, 146.2, 73/146.3, 146.4, 146.5, 146.8; 141/37, 38, 39; 137/227, 228, 229, 557, 552

[56] References Cited

U.S. PATENT DOCUMENTS

| 867,942 | 10/1907 | Bobrick | 141/38 X |
| 1,175,577 | 3/1916 | Ziegler, Jr. | 137/227 |
| 2,168,690 | 8/1939 | Uksila | 73/146.5 X |
| 2,233,235 | 2/1941 | Witthaus | 137/228 X |
| 3,335,766 | 8/1967 | Winger | 141/38 |
| 3,727,651 | 4/1973 | Biever | 141/38 X |
| 3,859,849 | 1/1975 | Novak | 73/146.8 |
| 4,510,979 | 4/1985 | Hjorth-Hansen | 141/38 X |
| 4,619,135 | 10/1986 | Nunn | 73/4 R |
| 4,694,409 | 9/1987 | Lehmon | 73/146.8 X |
| 5,158,122 | 10/1992 | Moffett | 73/146.84 |

FOREIGN PATENT DOCUMENTS

| 367005 | 12/1920 | Fed. Rep. of Germany | 141/38 |
| 1113378 | 8/1961 | Fed. Rep. of Germany | 137/228 |
| 221424 | 4/1985 | Fed. Rep. of Germany | 141/38 |
| 681204 | 5/1930 | France | 137/229 |
| 23157 | of 1907 | United Kingdom | 73/146.8 |
| 332795 | 7/1930 | United Kingdom | 137/228 |

OTHER PUBLICATIONS

4 Page Brochure Type 11-018 Precision Regulator by Norgreen of Littleton, Colo. NC-207 Sep. 1977.

*Primary Examiner*—Tom Noland
*Attorney, Agent, or Firm*—Cushman, Darby & Cushman

[57] ABSTRACT

A pneumatic calibration device is provided including a body having an air inlet port and an air outlet port, a pressure gauge extending from the body, and a mechanism for adjusting pressure disposed within the body. The pressure adjusting mechanism communicates with the pressure gauge. The air inlet and outlet ports are pneumatically coupled to the pressure adjusting mechanism so as to regulate inflation of an inflatable member.

6 Claims, 3 Drawing Sheets

AUTOMATIC EQUIPMENT FOR PNEUMATIC CALIBRATION

This invention relates to an automatic equipment for pneumatic calibration. In particular, to a device for automatically calibrating automobile tires or the like. The device is simple in construction and easy to use.

The device is sized for use in automobile service stations, tire repair shops and may be used by highway transportation companies, urban and highway collective transportation companies for vehicles in general.

The device is substantially different from traditional devices because it is a low-cost, easy-to-handle and simply constructed device. Also, calibration of the device is rapid (nearly five seconds per operation). Conventional tire calibration equipment typically demands the participation of two people in the process. One person controls the pressure gauge, while the other person takes care of the tire by adjusting the filling nipple (pen) to the tire valve. Alternately, one person may perform the process by first connecting the nipple to the valve and then moves to the pressure gauge to control the filling or emptying of the tire, and then moves to another tire, and so on.

Thus, it is evident that the conventional process is difficult and a time consuming operation. One can imagine the time and difficulty required in calibrating eighteen tires of a large truck.

In order to remove the above mentioned difficulties, the device of the present invention was developed.

DETAILED DESCRIPTION OF THE PRESENTLY PREFERRED EMBODIMENTS

Figure 1:
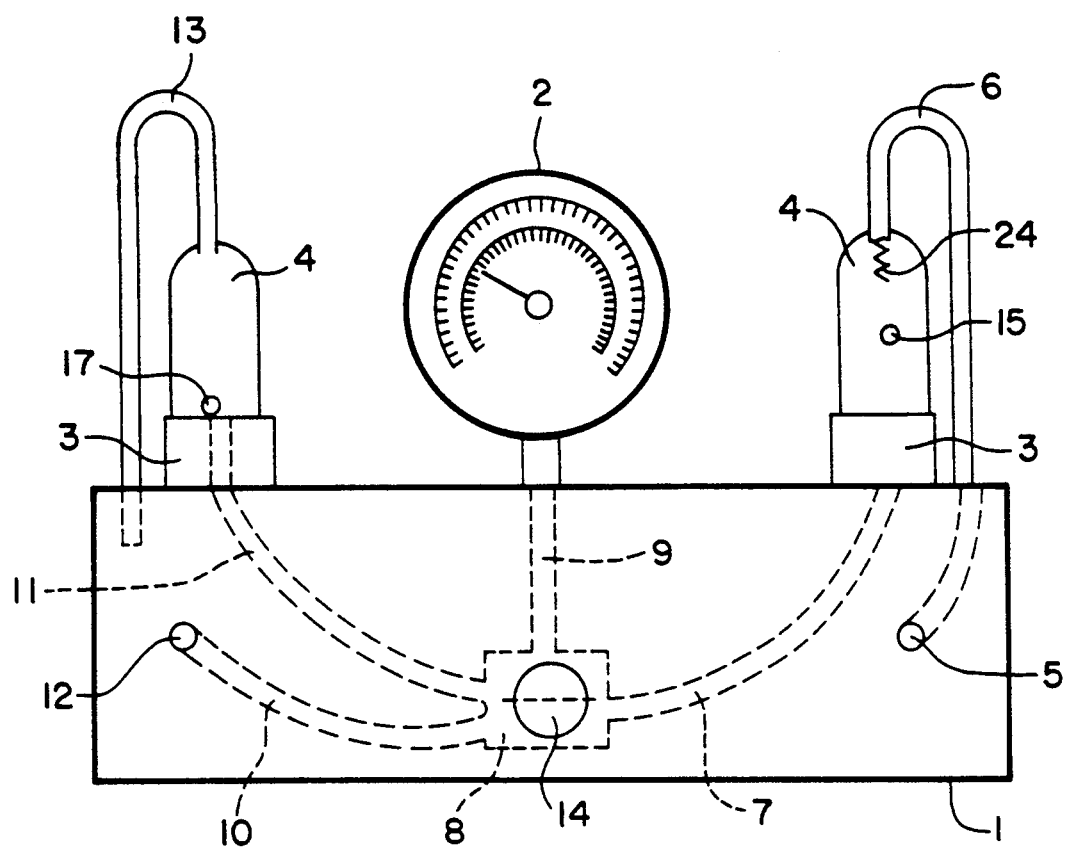
FIG. 1 is a front plan view of the device provided in accordance with the principles of the present invention.
Figure 2:
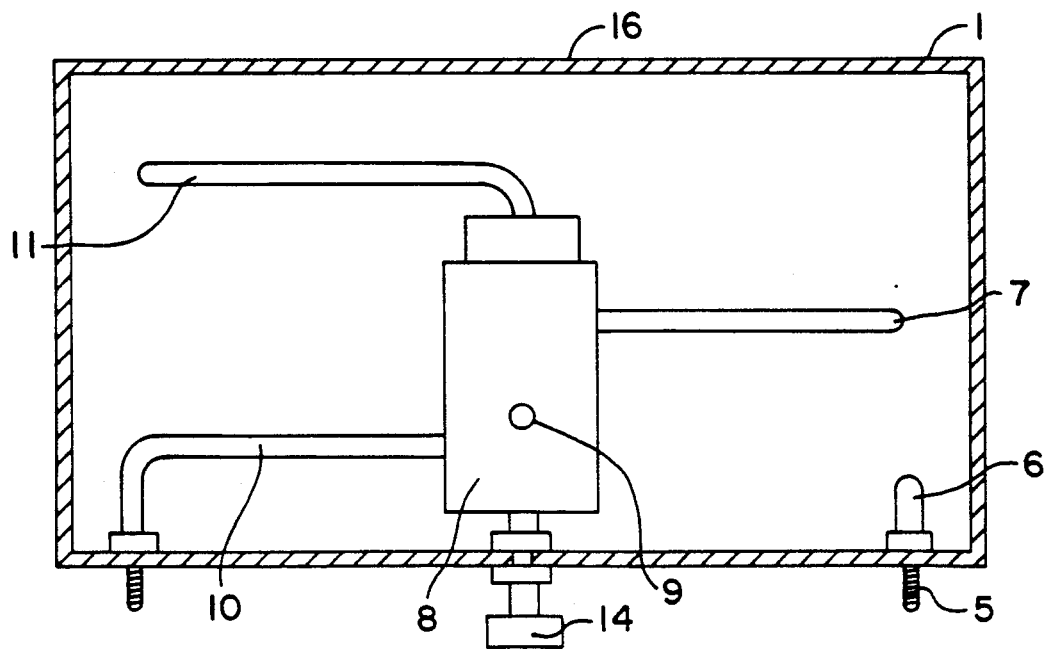
FIG. 2 is a partial internal view of the device as seen from above.

As shown in FIGS. 1 and 2, the device for automatic pneumatic calibration comprises a body 1. A manometer-type pressure gauge 2 is placed at the upper face of body 1 and bears two pressure measuring scales - Kgf/cm$^2$ and lbf/in$^2$. Disposed on each side of the manometer 2 are two cylindrical bases 3 of polypropylene, which support transparent polycarbonate cups 4. One cup 4 is connected to nipple 5 which supplies compressed air for filling tires.

Nipple 5 is connected to hose 6. Hose 6 is disposed at the upper end of cup 4. A second hose 7 is connected to a lower end of cup 4. Hose 7 is connected to a precision pressure adjusting device 8. Hose 9 connects the precision pressure adjusting device 8 to the manometer 2.

Hose 10 connects pressure adjusting device 8 to nipple 12 which receives compressed, air from a compressor. Thus, the compressed air enters nipple 12 and is directed through the pressure adjusting device and is received in the polycarbonate cup 4, disposed to the left of the manometer 2 in FIG. 1. Hose 11 connects a lower end of cup 4 to the pressure adjusting device 8. Hose 13 is connected to an upper end of cup 4 and is projected into body 1. The lower end of hose 13 is open to the atmosphere.

The device functions as follows. Compressed air reaches the device through nipple 12 and is sent to the precision adjusting device 8. The calibrator (operator) adjusts the desired pressure by moving a small control wheel 14 of precision adjusting device 8 and observes the pressure gauge 2 until the pressure is at the desired level. At this time, the wheel is no longer turned and the pressure gauge 2 remains static at the desired pressure level. Thus, it is evident that the operation of the device is easy to understand.

Once the pressure is adjusted to the desired level, the operator connects the filling nipple 5 to the tire valve. The tire filling operation is immediately started and is ended when the tire pressure is identical to that of the system (shown on the pressure gauge 2). This operation takes no more than five seconds, under normal calibration conditions.

A small sphere 15 moves inside the polycarbonate cup 4 showing the operation that the tire is being filled. A helical spring 24 prevents the sphere 15 from clogging the mouth of hose 6. If the tire pressure is beyond the desired level, pressure reduction is made automatically, since, by detecting such a situation, the precision adjusting device 8 takes the excessive compressed air through hose 11 entering cup 4 disposed left of gauge 2 and hose 13, and releases the excess pressure to the atmosphere via hose 13. The excess air is vented through slots 16 in body 1.

Figure 4:
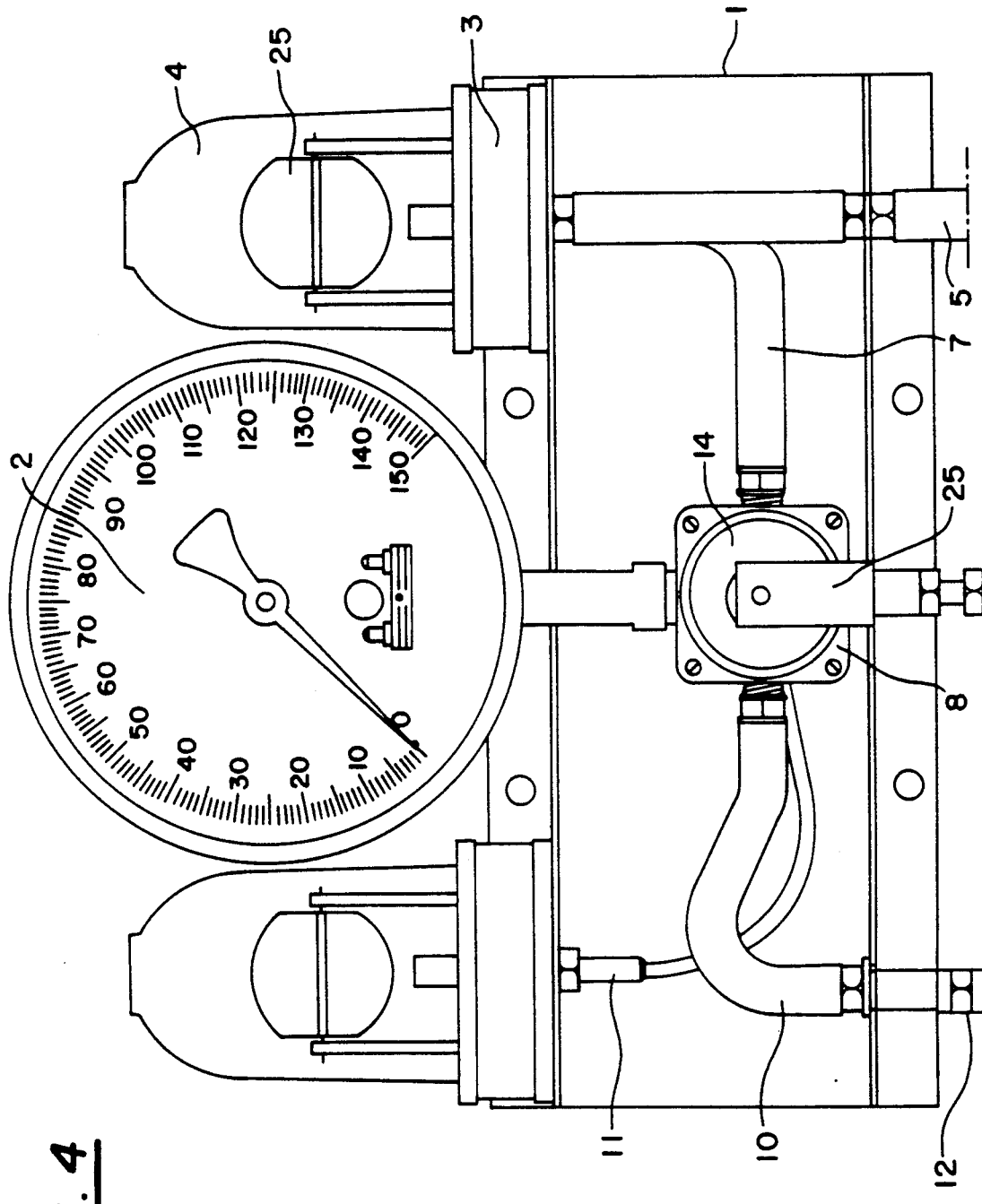
FIG. 4 is a front schematic view of the device of the present invention showing mechanical vanes as indicating members.

When a tire is emptied, the sphere 17 moves, showing the operator that an emptying operation is being performed. The emptying operation is ended when the pressure equals that shown in pressure gauge 2. Thus, movement of spheres 15 and 17, preferably of different colors, provides an indication to the operator whether the tire is being filled or being emptied. When the sphere stops moving, the tire pressure is equal to the preselected pressure depicted on gauge 2. It can be appreciated that as an alternative to the spheres 15, 17, other indicating means may be uses, such as a liquid containing air bubbles, mechanical vanes 25 (FIG. 4) or luminous or audio signals.

Figure 3:
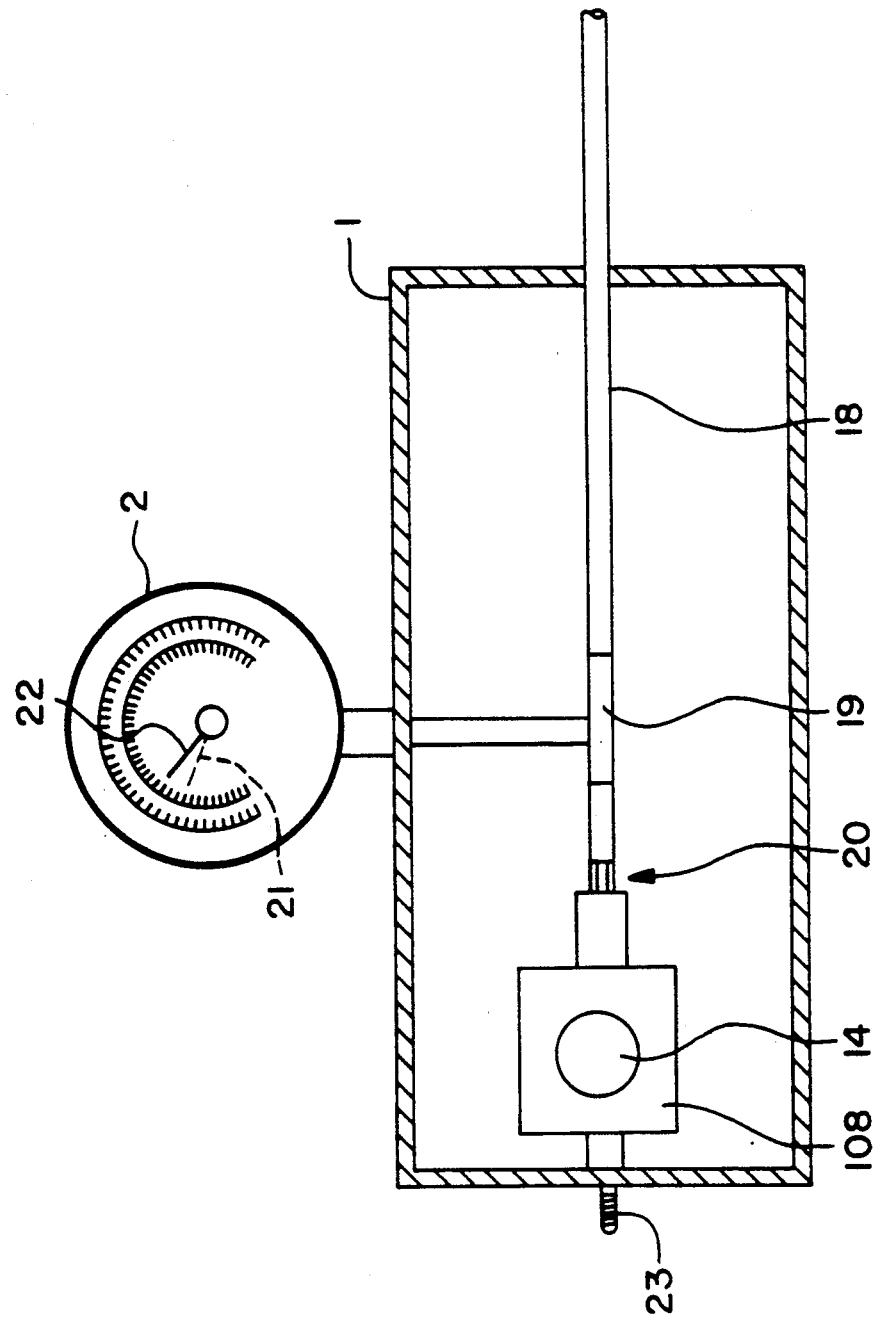
FIG. 3 is a schematic front view of a second embodiment of the device provided in accordance with the principles of the present invention.

Through a digital pressure gauge, the device also detects whether or not there is a hole in the tire by obstructing the air outlet with the device shown in FIG. 3.

The device for automatic pneumatic calibration need not include the polycarbonate cups 4, as shown in a second embodiment of FIG. 3. In this embodiment, the compressed air reaches the pressure adjusting device 108 (common adjuster without precision) through nipple 23 and reaches pressure gauge 2 through connection 20. A "T" pipeline 19 directs the compressed air to pressure gauge 2. Hose 18 directs the air to the tire filling nipple which is connected to the tire. The desired pressure 21 is adjusted by moving wheel 14 of the adjusting device 108. The filling process is automatically started and controlled by the adjusting device 108. If the tire pressure is higher than the desired pressure 21, the pressure gauge will show this reading 22 and will immediately begin to empty the tire.

In either embodiment, the operation is automatically concluded when the tire pressure reads exactly as the pressure preselected at the pressure gauge 2. Finally, the device may also include fixation handles.

What is claimed is:

1. A pneumatic calibration device comprising:

a body having an air inlet port and an air outlet port;
a pressure gauge extending from said body;
means for adjusting pressure disposed within said body, said pressure adjusting means communicating with said pressure gauge, said air inlet and outlet ports being pneumatically coupled to said pressure adjusting means so as to regulate inflation of an inflatable member; and
indicating means for indicating one of filling and emptying the inflatable member, said indicating means being pneumatically coupled to said pressure adjusting means,
said indicating means including first and second indicating members, said first indicating member being coupled to said outlet port and indicates that the inflatable member is being inflated, said second indicating member being coupled to the air inlet port, said second indicating member including means for venting air to the atmosphere and provides an indication that the inflatable member is being emptied.

2. The device as claimed in claim 1, wherein said pressure adjusting means include a precision pressure adjusting device having means for manually adjusting pressure.

3. The device as claimed in claim 2, wherein said adjusting means includes a movable wheel.

4. The device as claimed in claim 1, wherein each said first and second indicating members include a polycarbonate cup having a movable sphere therein for indicting the flow of air therethrough.

5. The device as claimed in claim 1, wherein each said first and second indicating members include a polycarbonate cup containing a liquid, air bubbles in said liquid indicating the flow of air therethrough.

6. The device as claimed in claim 1, wherein said each first and second indicating members includes a mechanical vane for indicating air flow therethrough.

* * * * *